US008538084B2

(12) United States Patent
Slack et al.

(10) Patent No.: US 8,538,084 B2
(45) Date of Patent: Sep. 17, 2013

(54) METHOD AND APPARATUS FOR DEPTH SENSING KEYSTONING

(75) Inventors: Brandon Dean Slack, Campbell, CA (US); Aaron Leiba, San Francisco, CA (US); Alex J. Crumlin, San Jose, CA (US); Jason Medeiros, Mississauga (CA)

(73) Assignee: Apple Inc., Cupertino, CA (US)

( * ) Notice: Subject to any disclaimer, the term of this patent is extended or adjusted under 35 U.S.C. 154(b) by 1347 days.

(21) Appl. No.: 12/206,554

(22) Filed: Sep. 8, 2008

(65) Prior Publication Data

US 2010/0061659 A1     Mar. 11, 2010

(51) Int. Cl.
*G06K 9/00* (2006.01)

(52) U.S. Cl.
USPC .......................................................... 382/106

(58) Field of Classification Search
USPC ................................................. 382/106, 154
See application file for complete search history.

(56) References Cited

U.S. PATENT DOCUMENTS

| | | | |
|---|---|---|---|
| 3,363,104 A | 1/1968 | Waite et al. |
| 3,761,947 A | 9/1973 | Volkmann et al. |
| 4,620,222 A | 10/1986 | Baba et al. |
| 5,272,473 A | 12/1993 | Thompson et al. |
| 5,274,494 A | 12/1993 | Rafanelli et al. |
| 5,337,081 A | 8/1994 | Kamiya et al. |
| 5,757,423 A | 5/1998 | Tanaka et al. |
| 6,282,655 B1 | 8/2001 | Given |
| 6,310,662 B1 | 10/2001 | Sunakawa et al. |
| 6,339,429 B1 | 1/2002 | Schug |
| 6,389,153 B1 * | 5/2002 | Imai et al. ...................... 382/106 |
| 6,416,186 B1 * | 7/2002 | Nakamura ....................... 353/69 |
| 6,516,151 B2 | 2/2003 | Pilu |
| 6,560,711 B1 | 5/2003 | Given et al. |
| 6,561,654 B2 | 5/2003 | Mukawa et al. |
| 6,636,292 B2 | 10/2003 | Roddy et al. |
| 6,807,010 B2 | 10/2004 | Kowarz |
| 6,862,022 B2 | 3/2005 | Slupe |
| 6,877,863 B2 | 4/2005 | Wood et al. |
| 6,903,880 B2 | 6/2005 | Beatson et al. |
| 6,921,172 B2 | 7/2005 | Ulichney et al. |
| 6,924,909 B2 | 8/2005 | Lee et al. |
| 6,930,669 B2 | 8/2005 | Weiner et al. |
| 6,931,601 B2 | 8/2005 | Vronay et al. |
| 6,970,080 B1 | 11/2005 | Crouch et al. |
| 7,028,269 B1 | 4/2006 | Cohen-Solal et al. |

(Continued)

FOREIGN PATENT DOCUMENTS

EP     167314      1/1986
EP     2053844     4/2009

(Continued)

OTHER PUBLICATIONS

Author Unknown, "YCbCr," http://en.wikipedia.org/wiki/Y%27CbCr, 4 pages, at least as early as Jun. 17, 2010.

(Continued)

*Primary Examiner* — Alex Liew
(74) *Attorney, Agent, or Firm* — Wong, Cabello, Lutsch, Rutherford & Brucculeri, L.L.P.

(57) ABSTRACT

A method for depth sensing keystoning. The method of depth sensing keystoning may include an optical system and electrical devices. The method of depth sensing keystoning may correct for image distortion using depth measurements.

16 Claims, 8 Drawing Sheets

(56) References Cited

U.S. PATENT DOCUMENTS

| | | |
|---|---|---|
| 7,058,234 B2 | 6/2006 | Gindele et al. |
| 7,079,707 B2 | 7/2006 | Baron |
| 7,123,298 B2 | 10/2006 | Schroeder et al. |
| 7,307,709 B2 | 12/2007 | Lin et al. |
| 7,352,913 B2 | 4/2008 | Karuta et al. |
| 7,370,336 B2 | 5/2008 | Husain et al. |
| 7,413,311 B2 | 8/2008 | Govorkov et al. |
| 7,453,510 B2 | 11/2008 | Kolehmainen et al. |
| 7,460,179 B2 | 12/2008 | Pate et al. |
| 7,512,262 B2 | 3/2009 | Criminisi et al. |
| 7,570,881 B2 | 8/2009 | Perala et al. |
| 7,590,335 B2 | 9/2009 | Kobayashi et al. |
| 7,590,992 B2 | 9/2009 | Koplar et al. |
| 7,598,980 B2 | 10/2009 | Imai et al. |
| 7,613,389 B2 | 11/2009 | Suzuki et al. |
| 7,629,897 B2 | 12/2009 | Koljonen |
| 7,641,348 B2 | 1/2010 | Yin et al. |
| 7,653,304 B2 | 1/2010 | Nozaki et al. |
| 7,658,498 B2 | 2/2010 | Anson |
| 7,834,846 B1 | 11/2010 | Bell |
| 7,869,204 B2 | 1/2011 | Bair et al. |
| 7,901,084 B2 | 3/2011 | Willey et al. |
| 7,964,835 B2 | 6/2011 | Olsen et al. |
| 2002/0021288 A1 | 2/2002 | Schug |
| 2003/0038927 A1 | 2/2003 | Alden |
| 2003/0086013 A1 | 5/2003 | Aratani |
| 2003/0117343 A1 | 6/2003 | Kling |
| 2004/0193413 A1 | 9/2004 | Wilson et al. |
| 2005/0132408 A1 | 6/2005 | Dahley et al. |
| 2005/0168583 A1 | 8/2005 | Thomason |
| 2005/0182962 A1 | 8/2005 | Given et al. |
| 2005/0219472 A1* | 10/2005 | Matsumoto .............. 353/69 |
| 2005/0280786 A1 | 12/2005 | Moiroux et al. |
| 2006/0140452 A1 | 6/2006 | Raynor et al. |
| 2006/0197843 A1 | 9/2006 | Yoshimatsu |
| 2006/0244742 A1 | 11/2006 | Nakamura et al. |
| 2007/0027580 A1 | 2/2007 | Ligtenberg et al. |
| 2007/0064976 A1* | 3/2007 | England .............. 382/106 |
| 2007/0177279 A1 | 8/2007 | Cho et al. |
| 2007/0236485 A1 | 10/2007 | Trepte |
| 2007/0300312 A1 | 12/2007 | Chitsaz et al. |
| 2008/0062164 A1 | 3/2008 | Bassi et al. |
| 2008/0131107 A1 | 6/2008 | Ueno |
| 2008/0158362 A1 | 7/2008 | Butterworth |
| 2008/0191864 A1 | 8/2008 | Wolfson |
| 2009/0008683 A1 | 1/2009 | Nishizawa |
| 2009/0027337 A1 | 1/2009 | Hildreth |
| 2009/0051797 A1 | 2/2009 | Yao |
| 2009/0115915 A1 | 5/2009 | Steinberg et al. |
| 2009/0221368 A1 | 9/2009 | Yen et al. |
| 2009/0262306 A1 | 10/2009 | Quinn et al. |
| 2009/0262343 A1 | 10/2009 | Archibald |
| 2009/0273679 A1 | 11/2009 | Gere et al. |
| 2009/0309826 A1 | 12/2009 | Jung et al. |
| 2010/0060803 A1 | 3/2010 | Slack et al. |
| 2010/0073499 A1 | 3/2010 | Gere et al. |
| 2010/0079426 A1 | 4/2010 | Pance et al. |
| 2010/0079468 A1 | 4/2010 | Pance et al. |
| 2010/0079653 A1 | 4/2010 | Pance |
| 2010/0079884 A1 | 4/2010 | Gere et al. |
| 2010/0083188 A1 | 4/2010 | Pance et al. |
| 2010/0103172 A1 | 4/2010 | Purdy |
| 2011/0074931 A1 | 3/2011 | Bilbrey et al. |
| 2011/0075055 A1 | 3/2011 | Bilbrey |
| 2011/0115964 A1 | 5/2011 | Gere |
| 2011/0149094 A1 | 6/2011 | Chen et al. |
| 2012/0044328 A1 | 2/2012 | Gere |
| 2012/0076363 A1 | 3/2012 | Kessler et al. |

FOREIGN PATENT DOCUMENTS

| | | |
|---|---|---|
| JP | 2002354493 | 12/2002 |
| WO | WO93/11631 | 6/1993 |
| WO | WO2007/100057 | 9/2007 |
| WO | WO2009/001512 | 12/2008 |

OTHER PUBLICATIONS

Sokolova et al., "Experiments in Stereo Vision," Computer Science 570, Final Project, http://disparity.wikidot.com/, 14 pages, at least as early as Jun. 16, 2010.

Koschan et al., "Finding Objects in a 3D Environment by Combining Distance Measurement and Color Indexing," IEEE, vol. 1, pp. 858-861, Oct. 2001.

* cited by examiner

METHOD AND APPARATUS FOR DEPTH SENSING KEYSTONING

CROSS-REFERENCE TO RELATED APPLICATIONS

This application is related to copending patent application Ser. No. 12/206,546, entitled "Projection Systems and Methods," and filed on Sep. 8, 2008, the entire disclosure of which is incorporated herein by reference.

FIELD OF THE INVENTION

The present invention generally relates to image processing systems and, more specifically, to depth sensing in combination with image processing for keystoning.

BACKGROUND

Multimedia presentations are a popular method of disseminating information to large numbers of people. The presentations may take place in a number of settings, such as meetings, conferences, educational settings and so on. The presentation may also take various forms, including video or audiovisual presentations. Sometimes, the image projection equipment may be placed in various locations and/or at various angles with respect to a projection screen for a number of reasons, including to increase the ability of the audience to view the images on the projection screen or because there may be no available surface to place the image projection system at a right angle to the projection screen.

An issue that is common to many image projection systems is image distortion. An image projection system that is placed at a non-right angle with respect to the projection screen may result in distortion of the projected image on the projection screen. For example, the image for projection may be a square, but the projected image on the projection screen may appear to the viewers as a trapezoid, may appear elongated and so on. Correcting image distortion is referred to as "keystone correction" or "keystoning."

A common keystoning method is to manipulate the position of the image projection system with respect to the projection screen so that the projected image becomes less distorted. Many current keystoning methods require multiple adjustments by the presenter to address the distorted image or the image processing system may have difficulty with image recognition in environments with various lighting conditions. Thus, a method of keystoning and a keystoning system that may operate with minimal interaction by the presenter as well as an image processing system that may function in environments having differing lighting conditions may be useful. Accordingly, there is a need in the art for an improved method of keystoning.

SUMMARY

One embodiment of the present invention takes the form of a computer-implemented method for correcting image distortion in an image projected on a surface. The method includes the operations of measuring a first distance between an image projection system and the surface, using a first measurement device to measure the first distance and measuring a second distance between the image projection system and the surface, using a second measurement device to measure the second distance. The method also includes calculating a horizontal slope of the surface with respect to a projection path of the image projection system, creating a transform using at least the horizontal slope and the vertical slope, and applying the transform to a first image thereby creating a second image.

Another aspect of the method includes calculating a vertical slope of the surface with respect to the projection path of the image projection system; and creating the transform using at least the vertical slope. Additionally, the operation of creating the transform using the vertical slope may include using the trigonometric function to calculate a second angle and using at least the second angle to create the transform. Further, the operation of creating the transform using the horizontal slope may include using a trigonometric function to calculate a first angle and using at least the first angle to create the transform. Moreover, the operation of using the first measurement device to measure the first distance may include using a depth sensor and the operation of using the first and second measurement devices may include using at least the first measurement device and a second measurement device located adjacent to a lens of the image projection system.

Further embodiments of this method may include using an accelerometer located on the image projection system to compensate for at least a yaw of the image projection system. Additionally, the method may include using additional depth sensors located on the image projection system wherein the additional depth sensors are oriented downwardly. The method may also include accounting for a pitch of the image projection system using the additional depth sensors. The method may also include accounting for the yaw of the image projection system using the additional depth sensors. The method may also include measuring a plurality of distances using a camera where each pixel is a depth sensor and may additionally include using at least one infrared sensor to output and detect selected infrared signals.

Another embodiment of the present invention may take the form of a computer-implemented method for calibrating an image projection system. In this embodiment, the method may include capturing at least a first image and a second image using at least a camera, determining a first set of points from the first image using at least the computer system and determining a second set of points from the second image using at least the computer system. The method may also include creating a first transform using the computer system, the first transform mapping the first set of points to a third set of points on a third image, creating a second transform using the computer system, the second transform mapping the second set of points to a fourth set of points on a fourth image and creating a final transform using the computer system, using the first transform and an inverted second transform. The method may also include applying an inverted final transform to the third image, using the computer system to apply the inverted final transform.

Continuing the description of this method, the first image may be an image of a projected image on a projection surface and the second image may be an image of a projection surface. Further, the first set of points may include the corners of the projected image on the projection surface and the second set of points may include the corners of the projection surface. Additionally, in this method the third set of points may include the corners of the raw image. In this method, the second set of points may also be substituted for the fourth set of points. Further in this method, creating the first transform may include using the equation $(a, b)=M(X,Y)$, wherein $(X,Y)$ is the first set of points, $(a,b)$ is the second set of points and M is the first transform. This method may also include using the least squares method to calculate the first transform M.

Still another embodiment of the present invention may take the form of an image processing system. The image processing system may include a plurality of sensors operative to perform at least depth measurements, an image processor operative to at least receive depth measurements from the plurality of sensors and to calculate image transforms and an image projection system operative to project at least a first image. The plurality of sensors of the image processing system may be infrared sensors that may be operative to perform at least depth measurements. Furthermore, the image processing system may include a camera, wherein the camera may include a plurality of camera pixels, each pixel being a depth sensor.

These and other advantages and features of the present invention will become apparent to those of ordinary skill in the art upon reading this disclosure in its entirety.

DETAILED DESCRIPTION OF EMBODIMENTS

Figure 1:
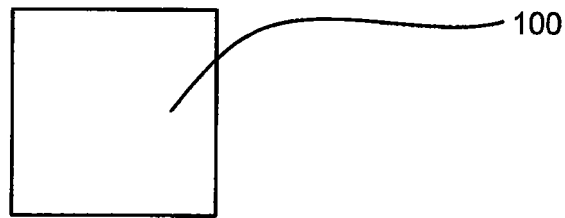
FIG. 1 shows a series of images including a raw initial image, an image without keystoning correction and the image with keystoning correction.
Figure 1:
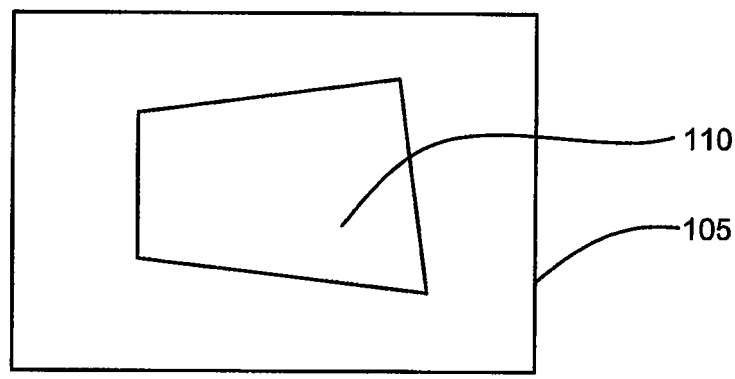
Figure 1:
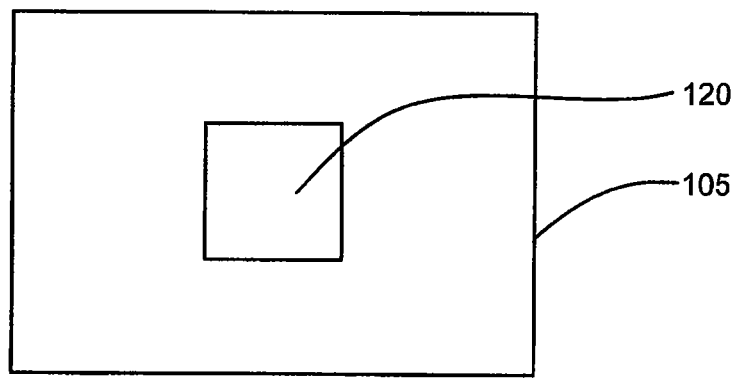

Generally, one embodiment of the present invention may take the form of an image processing system that corrects for image distortion on a projection screen or surface using at least a measured distance between a projection system and the projection screen or surface. One type of image distortion that may be corrected using the methods described herein, may be referred to, as "keystone correction" or "keystoning." Continuing the description of this embodiment, the image processing system may include an image projection system, an image processor and multiple sensors. The sensors may be placed on the image projection system at a known or determinable distance from one another. The sensors may be used to measure a distance between the image projection system and the projection surface. The distance measurements and the distance between the sensors may be used to substantially correct the image distortion of a projected image.

Another embodiment may take the form of a calibration method for an image processing system using captured images and using a projection surface. In this embodiment, the calibration method uses multiple captured images, where a first image may be captured and contain a projected image on a projection surface, referred to as a "captured projected image" and a second image may be of a projection surface, referred to as a "captured surface image." The images may be transferred to an image processor. A first set of points, referred to as "projected image points," may be determined from the captured projected image (e.g., first image) and a second set of points, referred to as "surface corner points," may be determined from the captured surface image (e.g., second image) using the image processor. The projected image points may be, for example, the corners of the projected image as shown in the captured projected image. The surface corner points may be, for example, the corners of the projection surface as shown in the captured surface image.

Continuing the description of this embodiment, a first transform may be created using the projected image points (first set of points), which may map the projected image points (first set of points) to a third set of points, referred to as "raw points." The raw points (third set of points) may correspond to points in the raw image or stated differently, may correspond to points in the image as it exists in the projection system and/or memory before output. The raw image may be the image in the projection system (a source image) or in other words, the image for projection. For example, the raw image may be a slide image in memory, where the slide image may be projected onto a screen (once the slide image is projected it may become a projected image). The raw points may be the corner points of the raw image or the corner points of the image in the projection system. The projected image points and the raw points may correspond to one another in the captured projected image and a raw image. For example, the first transform may map a point (e.g., from the set of projected image points), in the captured projected image to a point (e.g., from the set of raw points) in the raw image. As yet another example, the first transform may map a point in the upper left corner of the captured projected image to the respective upper left corner of the raw image. The transform may be created using eight points, such as four corner points from the projected image and four corner points of the projection surface. The transform may be a matrix that takes points from one frame in a projection system and maps or transforms them to another frame in the projection system. The transform may allow a point in one image to be mapped to a corresponding point in another image.

Still continuing the description of this embodiment, the surface corner points (second set of points) may be used to create a second transform that maps the surface corner points to a fourth set of points, referred to as "source resolution points." The source resolution points (fourth set of points) may correspond to the points of the resolution of the projector output. For example, the second transform may map four corner points of the projection surface to four corner points which may, in part, define a screen size. The source resolution points may be determined by the input provided to the projector. For example, a projector having 720 p input/output may have a resolution of 1280×720.

Yet another embodiment may take the form of a calibration method for an image projection system using captured images and a camera. In this embodiment, a camera may capture an image and transfer it to an image processor. Further, the camera may not be attached to the projector system. The image processor may determine a set of points from the image and create a transform using the set of points, then invert the transform and apply the transform to an image for projection. The image processing system may apply the inverted transform to images for projection so that the images may appear on the projection surface with keystoning correction.

Still another embodiment may take the form of a method for correcting image distortion using an image processing system. In this embodiment, a first distance and a second distance may be measured between an image processing system and a projection surface. The first distance may be measured using a first sensor and the second distance may be measured using a second sensor. The first and second distances may be used to calculate coordinates. The coordinates may then be used to adjust an image for projection onto the projection surface. In this embodiment, the light may not interfere with the image recognition because the image distortion correction may use measurements from depth sensors as opposed to measurements based on camera images. However, the depth sensors employed in the system may be susceptible to fluctuating infrared levels output by fluorescent lights.

It should be noted that embodiments of the present invention may be used in a variety of optical systems and image processing systems. Further, sensors that may be employed in the systems and that may be used to collect data, such as cameras or depth sensors, need not be attached to the image processing system and need not be part of the image processing system. The embodiment may include or work with a variety of computer systems, processors, servers, remote devices, self-contained projector systems, visual and/or audiovisual systems, optical components, images, sensors, cameras and electrical devices. Aspects of the present invention may be used with practically any apparatus related to optical and electrical devices, optical systems, presentation systems or any apparatus that may contain any type of optical system. Accordingly, embodiments of the present invention may be employed in computers, optical systems, devices used in visual presentations, visual peripherals and so on and in a number of computing environments including the Internet, intranets, local area networks, wide area networks and so on.

Before proceeding to the disclosed embodiments in detail, it should be understood that the invention is not limited in its application or creation to the details of the particular arrangements shown, because the invention is capable of other embodiments. Moreover, aspects of the invention may be set forth in different combinations and arrangements to define inventions unique in their own right. Also, the terminology used herein is for the purpose of description and not of limitation.

FIG. 1 is a series of images and includes an initial image 100, that, when projected onto a projection surface 105, results in a distorted image 110. The distorted image 110 may result if the projection surface 105 is flat and the projection system is not substantially orthogonal to each of a vertical centerline and horizontal centerline of the projection surface 105. Further, a distorted image 110 may result if the screen is at a non-orthogonal angle with respect to the projection system. Stated differently, either the projection surface or the projection system may be placed at a non-orthogonal angle with respect to one another, thus placing the vertical centerline and the horizontal centerline of the projection surface at a non-orthogonal angle. As shown in corrected image 120, the distortion may be substantially resolved via keystoning.

In FIG. 1, the images 100, 110, 120 may be produced by a system such as the image processing system 200 of FIG. 2. In FIG. 1, the initial image 100 (the raw image) may exist as a raw image or a source image in the projection system. The initial image 100, may be projected onto a projection surface 105, such as a projection screen, where a distorted image 110 may result. After keystoning correction to the distorted image 110, the corrected image 120 (projected image corrected using keystoning) may result, which may appear substantially similar to the initial image 100, except the corrected image 120 may not be the same size or resolution as the initial image 100 or the distorted image 110. The corrected image 120 may be scaled so that it may fit in the area of the distorted image 110 and additionally, the corrected image 120 use as many pixels as possible while still appearing corrected/keystoned. For example, if the initial image 100 and the corrected image 120 are different sizes, then it may not be possible to preserve every pixel from one image to another image. Continuing the example, every pixel from the initial image 100 may not map directly to the corrected image 120 due to the keystoning correction and/or the size differential of the images. In one case, there may not be one-to-one pixel correspondence between images. In this case, the image may be scaled to ensure that all outputted pixels are represented in some form. Stated differently, the image may be scaled as opposed to cropped. The keystoning methods and apparatuses described herein may produce a corrected image 120 without requiring the image projection system to be moved. Further, regardless of the orientation of the projection system to the projection screen, a distorted image 110 or the like may result, if the projection surface 105 is not substantially flat.

In one example, an image may be projected onto a projection surface 105 that may not be substantially flat. Further, the image projection system may be placed at a non-right angle with respect to the projection surface 105. (That is, the image projection system may not be placed substantially orthogonal to each of a vertical and horizontal centerline of the projection surface 105.) In this example, the projected image may appear distorted because the length of the projection path of the projected image may differ between the projection surface 105 and the image projection system. The lengths of the projection path may vary in different parts of the projected image because the projection surface 105 may be closer to the image projection system in some places and further away in other places. The projection path may be the path of the image between the projection system and the projection surface and even though described as "a projection path," may be separated into multiple lengths, where each length may be between the projection system and the projection surface. Thus, the lengths of the projection path may vary in a projection path.

The image distortion may result because the magnification of the projected image may change with increasing or decreasing distance from the optical axis of the image projection system. The optical axis may be the path of light propagation between the image projection system and the projection screen or surface. Accordingly, if the left side of the projection screen is closer to the image projection system, the projection path may be shorter for the left side of the projection screen. The result may be that a projected line may appear shorter on the left side of the projection screen then a projected line on the right side of the projection screen, although both lines may be of equal length in the original image.

Figure 2A:
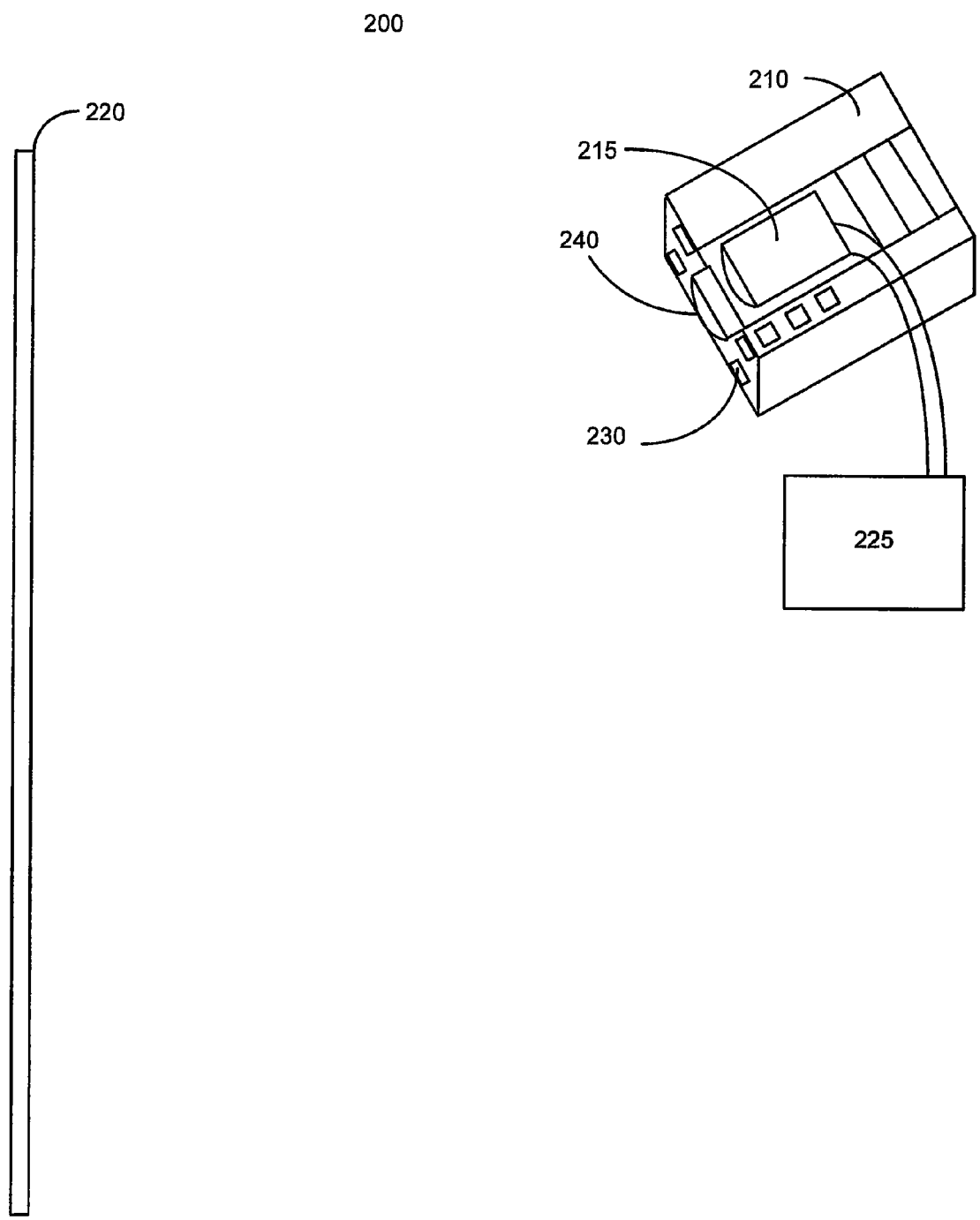
FIG. 2A shows an image processing system including an image projection system with sensors.

FIG. 2A depicts one embodiment of an image processing system 200. FIG. 2A includes an image projection system 210, a camera 215, a projection surface 220, an image processor 225 and multiple sensors 230. In FIG. 2A, the image projection system 210 of the image processing system 200 may project an image onto the projection surface 220. However, the image projection system 210 may not be parallel to the projection surface 220 as depicted in FIG. 2A, which may produce a distorted image (the distorted image without keystoning correction) on the projection surface 220 as previously discussed with respect to FIG. 1. The image processor 225 may be any type of processor, such as a central processing unit, a graphical processing unit and so on.

The sensors 230 in FIG. 2A may be sensors, such as depth sensors, and may be placed in various locations on or near the projection system 210. (The sensors 230 may be referred to herein as "depth sensors" for explanatory purposes only.) The sensors may also be accelerometers, which will be discussed in more detail below. In most embodiments, the positions of the depth sensors relative to the projection system are known. Likewise, the angles between each such sensor and a centerline of an image projection path are likewise typically known. For simplicity's sake, this document presumes an axis or path along which the sensor senses distance (e.g., depth) is substantially parallel to the centerline of image projection employed by the image projection system, although the principles discussed herein generally apply even when that is not the case.

In one embodiment, the depth sensors 230 may be placed adjacent to the lens 240 of the projection system 210. Additionally, the depth sensors 230 may be placed so that each depth sensor measures a distance between its respective location and the same projection surface. Generally, depth sensors may emit sonar/acoustic signals, electromagnetic radiation (such as infrared radiation) in different forms including an electromagnetic field, an electromagnetic signal and so on, and identify any differences in the emitted and returned electromagnetic field or electromagnetic signal. For example, if an image processing system includes four depth sensors, four measurements may be taken, where each measurement may be the distance between an emitting end of the particular depth sensor and a respective point on the projection surface. An image processing system may achieve keystoning correction using two or more depth sensors. The methodologies employed by the image processing system using two depth sensors will be discussed in further detail below.

The sensors 230 may also measure a reflected infrared beam's time of flight and thus may be used as proximity sensors. Generally, such infrared sensors may distinguish between ambient infrared in the environment and the reflected infrared signal of interest. For example, the infrared sensor may use frequency modulation to emit a specific frequency and detect only that frequency as it bounces off a target and is received by a detector integrated into the sensor. Accordingly, the infrared sensors may output a specified frequency, and measure the time of flight, in part, by detecting the specific frequency. The time of flight of the infrared signal may be used, in turn, to determine a depth measurement, insofar as the emission time, detection time and travel speed of the infrared beam are known.

The camera 215 may be any type of camera, including any video or image capture device such as a phone or personal digital assistant (PDA). Accordingly, Attorney Docket No. P6034 (190196/US), titled "Projection Systems and Methods," is herein incorporated in its entirety by reference. The camera 215 may also be placed adjacent to the image projection system 210 in the image processing system 200 of FIG. 2A. In one embodiment, the camera 215 may be located so that the optical image path of the camera and the measurement path of the depth sensors may be in a substantially similar direction and/or substantially parallel to one another.

The camera 215 may capture images, which in turn may be used for calibrating the image processing system 200. For example, the camera 215 may capture an image of the projection surface and an image of the projected image. The captured images may be transferred to an image processor 225 for storage, manipulation, calibration and so on. The image processor 225 may be operationally or directly connected to the camera 215 or the image projection system 210. The captured images may be used by an image processor computing system, for example, to compute a transform that allows mapping a point in an image prior to projection to the same point in a projected image. This mapping may take place in the image processor 225. Transforms and mapping of points from one image to another image will be discussed in more detail below. In another embodiment, the camera 215 may not be included in the image processing system 200. One sample embodiment lacking the camera 215 is discussed in further detail below, with respect to FIG. 6.

Figure 2B:
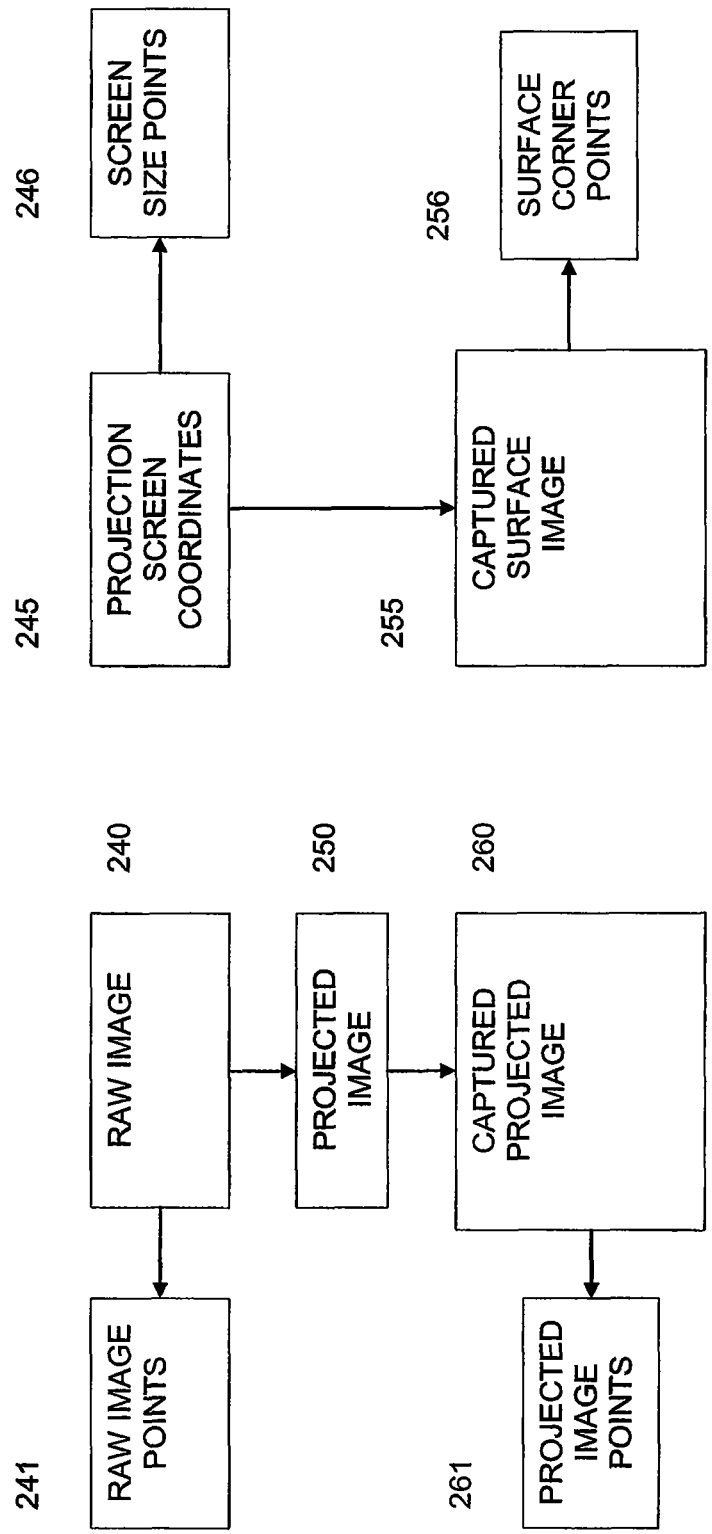
FIG. 2B shows an example of images that may be used in an image projection system with points that may be produced from each image.

FIG. 2B is an example of the images that may be used and/or produced by an image processing system, such as the system described with respect to FIG. 2A. A raw image 240 may exist in the image projection system 210. The raw image 240 may be projected and thus, become the projected image 250 of FIG. 2B. The projected image 250 may appear on the screen 220 of FIG. 2A. The camera 215 of FIG. 2A may capture an image, such as captured projected image 260 of FIG. 2B, which may be an image of the projected image 250 on the screen 220 (as shown in FIG. 3B). The image processing system 225 may produce a set of raw image points 241 from the raw image 240 and may produce a set of projected image points 261 from the captured projected image 260. The projected image points 261 may be the four corners of the projected image 250 that are shown in the captured projected image 260 (as depicted in FIG. 3B). Furthermore, the camera 215 may take a picture and produce the captured surface image 255, which may be an image of the screen 220. The captured surface image 255 and the projection screen coordinates 245 may be transferred to the image processing system 225. The image processing system may then produce a set of surface corner points 256 from the captured surface image 255. The surface corner points 256 may be the corners of the screen 220 in the captured surface image 255 (as depicted in FIG. 3B). The image processing system may also produce a set of source resolution points 246 from the projection screen coordinates 245. The source resolution points may be determined by the input provided to the projector. For example, a projector having 720p input/output may have a resolution of 1280×720. Additionally, the image processing system may map the projected image points 261 to the raw image points 241 and may also map the surface corner points 256 to the source resolution points 246. The methodology of capturing the images, using the images to produce sets of points and using the points to transform images will be discussed in further detail below.

Figure 3A:
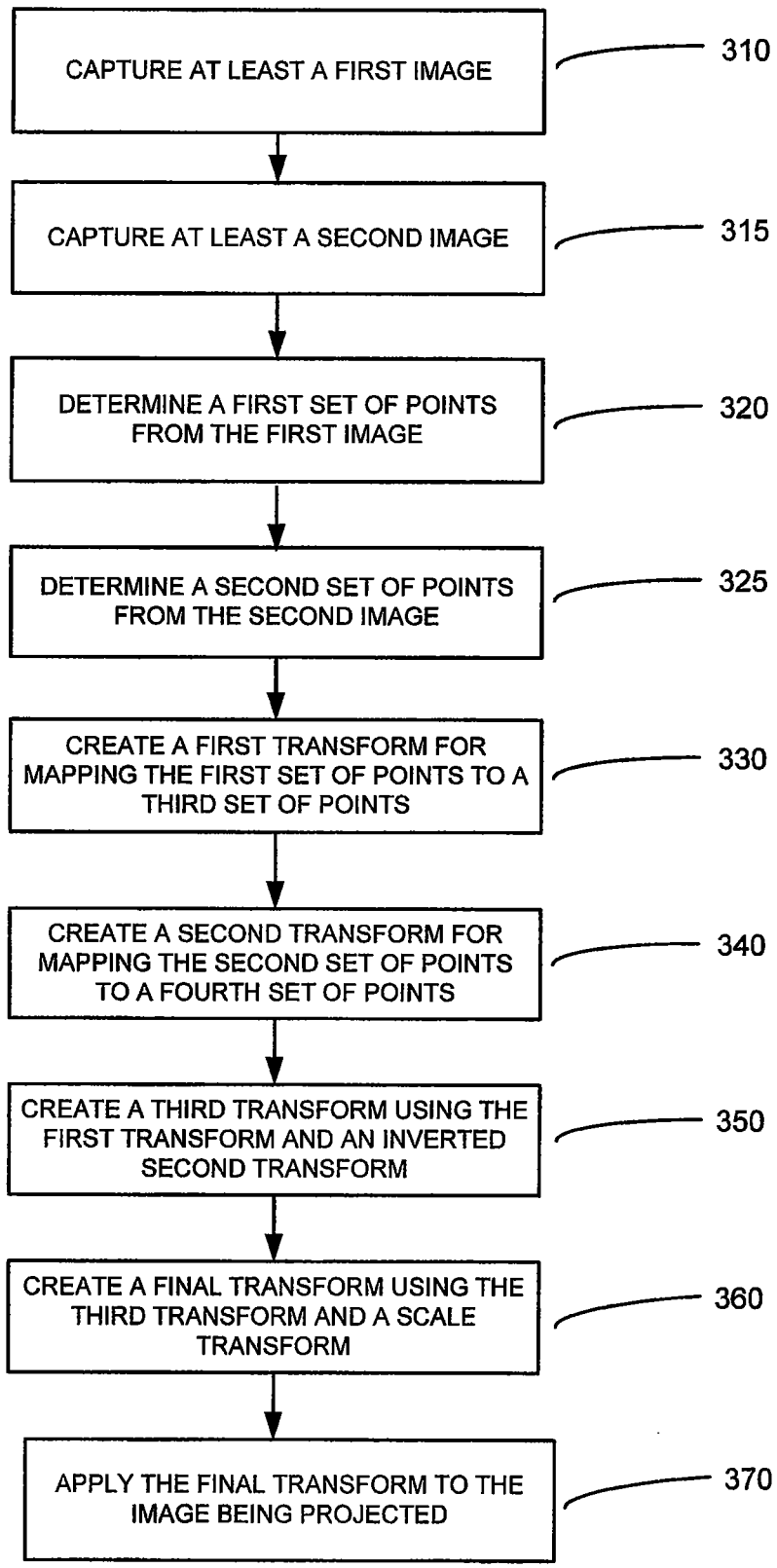
FIG. 3A is a flowchart depicting operations of one embodiment of a calibration method using a camera.
Figure 3B:
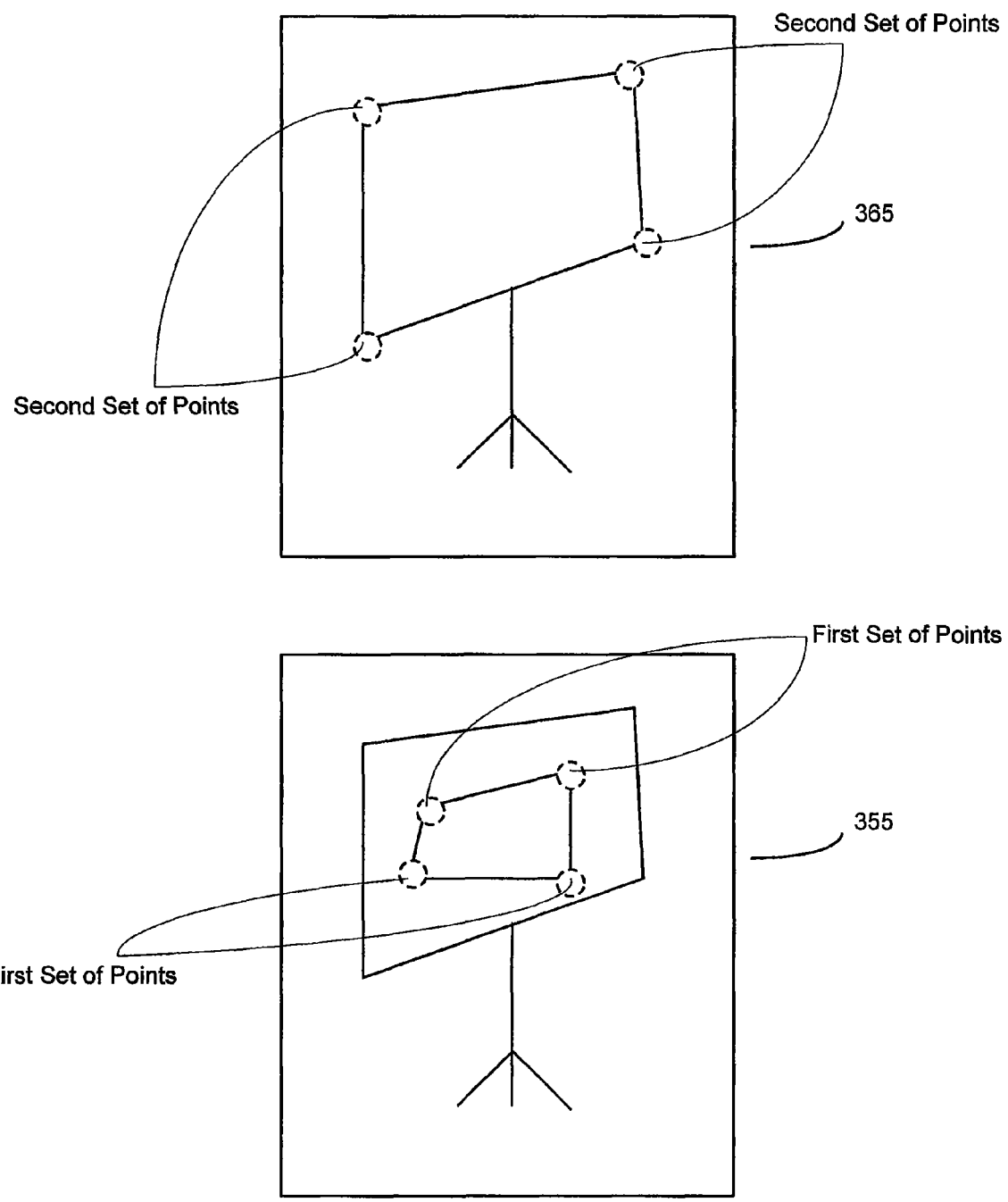
FIG. 3B shows an example of an image of a projection surface and an image of a projected image on a projection surface.

FIG. 3A is a flowchart generally describing operations of one embodiment of a calibration method 300. Unless stated otherwise, operations depicted in FIG. 3A are performed by the embodiment or an appropriate element thereof. For example, a processing element may compute transforms. The embodiment, by executing the calibration method 300, may create a final transform, map points from a projector to a camera image, and then create a pre-keystoned image for projection. The flow chart begins with operations 310 and 315, in which a camera captures a first image and a second image. The first and second images may be captured using a camera such as the camera 215 discussed with respect to FIG. 2. The first image may be an image of a projected image on a projection surface, referred to as "captured projected image" and the second image may be an image of the projection surface, such as a projection screen. The second image may be referred to as "captured surface image." The first and second images may be referred to herein, respectively as, "captured projected image" and "captured surface image" for purposes of description only. Further, in one example, the captured projected image may include an image of the projection surface with a projected image, while the captured surface image may be an image of the projection surface without a projected image.

FIG. 3B provides an example of the captured projected image 355 and the captured surface image 365. The captured projected image 355 depicts an image of a projected image on a projection surface and the captured surface image 365 depicts an image of a projection surface. The projected image of the captured projected image 355 may be any type of image including an actual image, white light and so on. When using white light, it may be necessary to adjust the ambient light to provide a lighting contrast such that the white light on the projection surface may be detected in the images taken by the camera. The captured projected image 355 may be used to find the projected screen points and the captured surface image 365 may be used to find the screen size points. An example of the methodologies that may be employed to find the previously referred to points, will be discussed in further detail below.

With respect to the flowchart of FIG. 3A, the captured projected image and the captured surface image may be captured in any order. Although the example provided describes two captured images, more than two images may also be captured. For example, multiple images may be captured, where each of the multiple images may be captured projected images. Then one image that may represent the captured projected image may be produced by averaging the color values of the multiple captured projected images. It is also possible to determine a final transform that may be used to correct for keystoning in projected images, using a single image, which will be discussed with respect to FIG. 4. The first and captured surface images may be transferred and optionally stored on an image processor for image processing purposes, such as calibration and keystoning correction. The image processor may include a central processing unit and also optionally, a graphical processor, application specific integrated circuit or other appropriate software and/or hardware.

Next, in operations 320, 325, a processor (such as a central processing unit with image software, a video processor and so on) may determine a first set of points, referred to as "projected image points," from the captured projected image and may determine a second set of points, referred to as "surface corner points," from the captured surface image. The first and second set of points may be respectively referred to as "projected image points" and "surface corner points," for explanatory purposes only. The first and second set of points may be any set of points from the captured projected image and the captured surface image. For example, in FIG. 3B, the projected image points may be determined from the captured projected image 355. The projected image points, as shown in FIG. 3B, may be four points that approximately correspond to the four corners of the projected image in captured projected image 355 and the surface corner points (also shown in FIG. 3B) may be four points that approximately correspond to the four corners of the projection screen in captured surface image 365. (It is possible that the camera may not capture and/or recognize the corners of the screen. In this case, the image might not be corrected using this keystoning method.) The first and second set of points may be located in various ways including vision recognition algorithms including edge detection algorithms, corner finding algorithms and so on. For example, an algorithm may recognize edges by detecting a substantial difference in color between adjacent pixels, and further may use the aggregated pixel information to recognize the shape of a corner in an image. In an alternative embodiment, before application of the edge detection method to the images, any number of points, such as two or greater may be determined from the captured projected image and captured surface images and may correspond to features in the images. Additionally, a differential may be run between the captured projected image and the captured surface image, and then the two images may be modified into binary images which may be black and/or white (0 or 1) pixels. All color values may be converted to a desired value based upon some characteristic such as the luma and/or the red, green, blue ("RGB") values. Any number of optical techniques may be used to determine the sets of points including, but not limited to, optical mark recognition using reference points, identifying contrast and/or lighting differentials, identifying color differences between adjacent pixels in the image and so on.

In operation 330, the processor may compute the first transform using the projected image points. The first transform may map the projected image points to a third set of points, referred to as "raw points" for the purposes of explanation only. For example, in FIG. 3B, the projected image points may be determined from captured projected image 355 of the projected image on a projection surface. The projected image points may be the four corners of the projected image on the projection surface. The four corners may be detected using any type of algorithm including a corner finding algorithm, an edge detection algorithm, the Smallest Univalue Segment Assimilating Nucleus algorithm ("SUSAN algorithm") and so on. In one example, the four corners may be determined by comparing the captured projected image 355 with the captured surface image 365 in FIG. 3B. Continuing this example, the captured projected image 355 may be compared to the captured surface image 365 to determine differences between the two images. The differences may be detected by comparing a pixel in the captured surface image 365 to a corresponding pixel in the captured projected image 355.

Continuing the example, the raw points may be determined from the image for projection or the raw image. In this example, the raw points may be the corners of the raw image that correspond to the corners of the projected image. Stated differently, the projected image points and the raw points may be corresponding corners of the projected image and the raw image. Accordingly, each point from the projected image points may have a corresponding point in the raw image. Thus, because the projected image points may be determined from the projected image of the raw image and the raw points may be determined from the raw image. Accordingly, the first transform may map the four corners of the projected image on the projection surface to the four corners of the raw image or the image for projection.

In one example, the matrix M may be determined and may be applied to the raw image so that the projected image may appear with keystoning correction. Continuing this example, the projected image points may be the points from the projected image on the projection surface and may be referred to as (X, Y). The raw points may be the points from the raw image and may be referred to as (a, b). The processor may employ the following equation:

$$(a, b) = M(X, Y)$$

where $$(a, b) = \frac{(P1X + P2Y + P3)}{(P7X + P8Y + P9)} \frac{(P4X + P5Y + P6)}{(P7X + P8Y + P9)}$$

and further, $$\begin{pmatrix} aW \\ bW \\ W \end{pmatrix} = \begin{pmatrix} P1 & P2 & P3 \\ P4 & P5 & P6 \\ P7 & P8 & P9 \end{pmatrix} = \begin{pmatrix} X \\ Y \\ 1 \end{pmatrix}$$

Using the equations above and the least squares method, the matrix M may be found. In the equation above, the sum of the nine points may be one, as the projection surface may be flat and may exist in one plane, therefore, P9 may be calculated.

For example, the projected image points from the projected image and the raw points from the raw image may be determined multiple times, thus yielding a greater number of equations then the number of unknown variables. Accordingly, the processor may employ the least squares method to solve a large number of unknown terms. The least squares method is one of various methods that may be employed to solve for a large number of unknown terms.

In operation 340, the processor may compute the second transform, C, using the second set of points, referred to as "surface corner points," and may create a second transform for mapping the surface corner points to a fourth set of points, referred to as "source resolution points." The fourth set of points may be referred to as "source resolution points" for explanatory purposes only. The source resolution points may correspond to projection screen coordinates of the image being projected. Stated differently, the source resolution points may be used to project the image within the area that may be defined as the projection screen or surface. For example, the surface corner points, as shown in FIG. 3B, may be determined from the captured surface image 365 of the projection surface or screen. The surface corner points may be the four corners of the projection surface. Continuing the example, the second transform may be created using the surface corner points. Further, the second transform may map the surface corner points of the projection surface to a set of source resolution points that may correspond to projection screen coordinates, so that the image being projected may appear within the defined area of the projection surface or screen. The source resolution points may be determined by the input provided to the projector. For example, a projector having 720 p input/output may have a resolution of 1280× 720.

Next in operation 350, a third transform, P, may be created using the first transform matrix M from operation 330 and the second transform, C, from operation 340. In one embodiment, the third transform may be created by concatenating the inverted second transform with the first transform using the following equation:

$$P=C^{-1}M$$

In operation 360, a final transform, W, may be created using the third transform and a scaling transform with the following equation:

$$W=P^{-1}S$$

The scaling transform, S, may be used to modify the scale and/or size of the image for projection. Furthermore, the scaling transform may appropriately scale the image while preserving the aspect ratio.

Then in the operation of block 370, the final transform, W, may be applied to the image for projected and the image for projection may be corrected for keystoning distortion. For example, a raw image may be a square and the projected image may be distorted. For example, before applying the final transform to the distorted projected image, the distorted projected image may appear as a trapezoid with varying side lengths. After applying the final transform, the corrected projected image may appear as a square.

Figure 4:
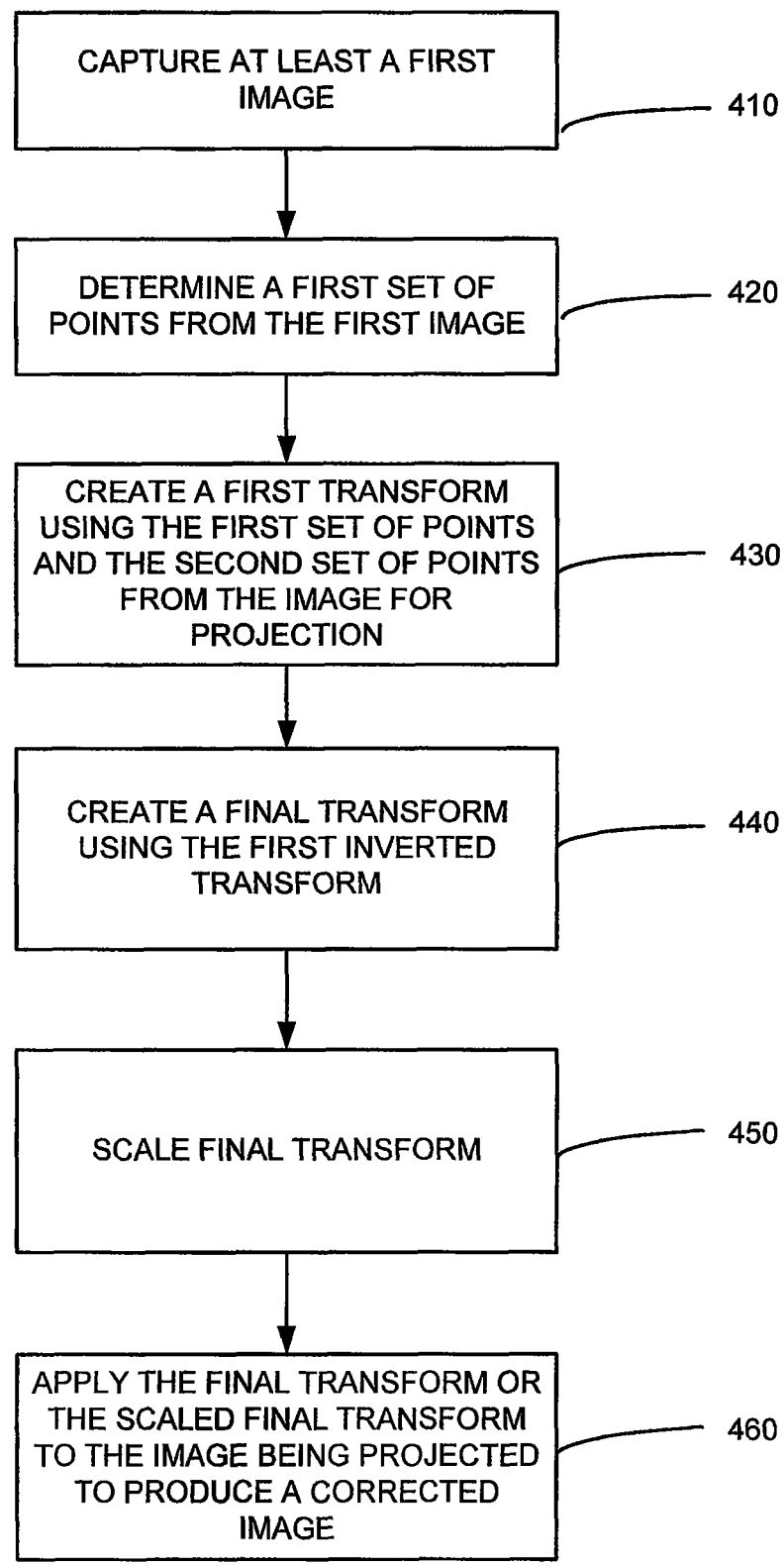
FIG. 4 is a flowchart depicting operations of another embodiment of a calibration method.

An alternative calibration method may create a transform that maps points between the projection screen and the camera image. FIG. 4 is a flowchart generally describing operations of this embodiment of a calibration method 400. As with FIG. 3A, the operations set forth in FIG. 4 are generally executed by the embodiment or an appropriate element thereof, such as a processor. Similar to FIG. 3A, the flow chart 400 of FIG. 4 begins with operation 410, wherein the camera may capture at least a captured projected image. In one example, the captured projected image may be an image of a projected image on a projection screen. The captured images may be transferred to and stored on a processor that may be part of an image processing system. As discussed previously with respect to FIG. 3A, any number of images may be captured, but for explanatory purposes, a first captured image is discussed with respect to FIG. 4. When employing the calibration method of FIG. 4, additional images may not necessarily be employed.

In operation 420, the processor may determine a projected image points from the captured projected image, similar to the determination of a projected image points made in FIG. 3A. The processor may determine the set of points, which may be the four corners of the projection screen. The set of points or the four corners of the projection screen may be determined using edge detection algorithms including a Smallest Univalue Segment Assimilating Nucleus algorithm ("SUSAN algorithm"). The edge detection may start detecting edges by initiating its search in the center of the image and radiate from the center of the image towards the outside of the image. It is possible to locate only two corners of the projection screen and calculate the other two corners if necessary. Additionally, the raw corner points may be the set of points corresponding to the corners of the raw image.

Next, in operation 430, transform, M, may be created using the previously discussed sets of points, or may be the same transform M of operation 330 from FIG. 3A. A similar method to the operation of block 330 in FIG. 3A may be used. In the operation of block 440, the final transform, P, may be defined using the following equation:

$$P=M$$

The operation of block 450 is optional and may be employed as needed and/or when the image may need to be re-sized and/or scaled.

Further, in operation 450, the final transform P may be scaled, if needed, using the following equation employing the inverted transform P and scale transform S, where S may be a scale rigid body transform:

$$W=P^{-1}S$$

In the operation 460 the final transform P or scaled final transform W, may be applied to the image for projection to obtain the correct image for projection onto the projection surface.

Figures 5, 5A:
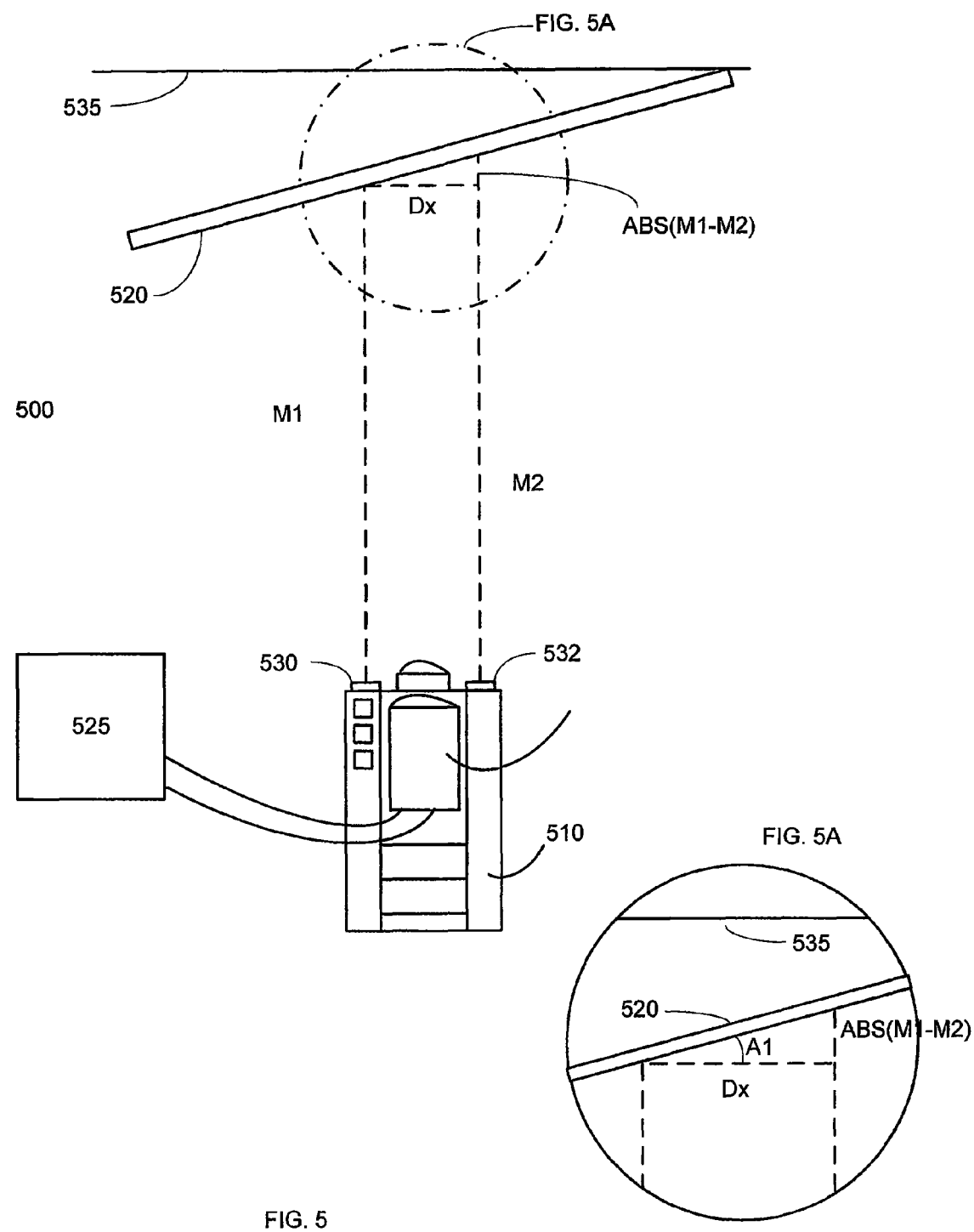
FIG. 5 shows an optical processing system depicting one embodiment of a keystoning method and system.

FIG. 5 is an example of an image processing system 500 showing the measurement paths of the depth sensors. Similar to the image processing system 100 of FIG. 1, the image processing system 500 includes a projection system 510, a projection surface 520, an image processor 525 and multiple sensors 530, 532. Additionally, FIG. 5 includes a first distance M1, a second distance M2 and a distance Dx.

In one embodiment, an image may be projected onto the projection surface 520 by the projection system 510. The image may be distorted for a number of reasons such as the angle of the projection surface 520 with respect to the projection system 510 being non-orthogonal. For example, the projection surface 520 may not be parallel to a surface 535 positioned orthogonally to the projection path of the projection system 510. A first depth sensor 530 may measure a first distance M1 and a second depth sensor 532 may measure a second distance M2. The first and second depth sensors may be separated by a distance Dx and a distance Dy, both of which may be known or determinable. The distance Dx may be the horizontal distance between the two sensors. Although not shown in FIG. 5A, Dy may be the vertical distance between the two sensors.

As depicted in FIG. 5A, a horizontal slope may be calculated by using the absolute value of the difference between the first distance M1 and the second distance M2, and the distance Dx between the first and second sensors 530, 532. The angle A1 between the projection surface 520 and the orthogonal plane 535 may then be calculated in a number of ways, including using any known trigonometric function. The angle A1 may be used to create a rotational matrix for correction of the image distortion of the projected image. In this example, the matrix or transform created may be applied to the image for keystoning correction about one axis.

Similarly, a vertical slope may be calculated by using the absolute value of the difference between the first distance M1 and the second distance M2, and the distance Dy between the first and second sensors. Using the method described herein, another angle A2 may be calculated, a transform may be created using angle A2 and applied to the image. By applying the transform to the raw image, a resulting projected image may be substantially free of distortion or the transform may be applied to the image for keystoning correction.

In one example, two points may be used to correct a distorted image with respect to one axis. Further, the determination may be made, using the two points, of whether an area of the projection surface is closer than another area of the projection surface to the projection system, along the axis defined by the two points. Likewise, three points or greater, may be determined from the captured projected images and captured surface images and may correspond to features in the images. For example, three points may be used to correct a distorted image with respect to two axes. The determination may be made, using three points, of whether an area of the projection surface may be closer than the corresponding opposite area of the projection surface along the two axes defined by the three points. Thus, a correction about two axes may be made using the information from the three points.

In another embodiment, an additional sensor such as an accelerometer may be included in the projection system 510. The accelerometer may be used in addition to the depth sensors 530, 532 to calibrate the projection system 510 and account for image distortion. The accelerometer may be employed to find the pitch, the roll and/or the yaw of the projection system 510. The pitch of the projection system 510 may occur when the right or left side of the projection system 510 is elevated. For example, the projection system 510 may be oriented towards a projection surface 520 and the right side of the projection system 510 may be elevated higher than the left side of the projection system 510 or vice versa. The roll of the projection system 510 may be accounted for when the front or back side of the projection system 510 is elevated. The front side of the projection system 510 is typically the side of the projection system 510 where the projection system lens is located. Further, the yaw may be accounted for when the projection system 510 is located flat on the surface but rotated about a vertical axis through the projection system 510. Moreover, a gyroscope may be employed to account for the yaw, pitch and/or roll of the projection system.

Continuing this embodiment, the accelerometer may be operationally connected to a processor, which may receive the accelerometer data. The accelerometer data may provide positional information with respect to the original axis of the projection system at calibration, thus, the processor may use the data to determine the orientation of the projection system 510. Furthermore, the processor may use the data to compute a transform to correct for the image distortion of a projected image in a similar manner as described with respect to the two depth sensors. The accelerometer data may be used for correcting any movement of the projection system after the initial calibration and/or keystoning corrections. The accelerometer data may eliminate the need for creating another transform using the depth sensor data for keystoning image correction, as the correction for the movement of the system may be done using the positional information provided by the accelerometer. Furthermore, accelerometers may be used to detect the orientation of the projection system and may correct the projection of the image to account for the orientation of the projection system. For example, the projection system may be oriented upside down. The accelerometers may account for the upside down orientation of the projection system by rotating the image accordingly. This embodiment may be employed for any type of keystoning, in addition to depth sensing keystoning. Furthermore, accelerometers may be used to trigger auto keystoning when sudden movement is sensed as opposed to relying primarily on depth sensors. This may allow for the depth sensors to be temporarily blocked by an individual walking in front of the system or a person to give a presentation without causing the projector to auto keystone to the presenter.

In yet another embodiment, additional depth sensors (where the additional depth sensors may be in addition to the sensors 230 of FIG. 2) may be used to correct for the pitch and roll of a projection system with respect to the surface it may be resting on. In this embodiment, the depth sensors may be mounted on the projection system 510 of FIG. 5, but oriented downwardly. The roll and the pitch of the projection system 510 may be accounted for depending on the location of the additional depth sensors. For example, one additional depth sensor may be located at each of the four corners of the projection system 510 and the four additional depth sensors may be oriented downwardly. The additional depth sensors may provide measurements to determine whether the right side of the projection system 510 is higher then the left side of the projection system 510 or vice versa.

Moreover, the additional depth sensors may provide measurements to determine whether the front side of the projection system 510 is higher then the back side of the projection system 510 or vice versa. For example, the depth sensors may measure the respective distances between the location of the depth sensor and the surface on which the projection system 510 is located. Similar to the accelerometer, the depth sensors may be operationally or directly connected to a processor which may receive the depth sensor data. The processor may then use the measurements to account for the roll and the pitch of the projection system 510. Furthermore, it may be possible for the additional depth sensors to be oriented in any direction including downwards, upwards, outwards from the sides of the projection system and so on and to provide the functionality of accounting for the position of the projection system 510 with respect to the projection surface or screen 520 so that the projected image may be corrected for distortion.

Figure 6:
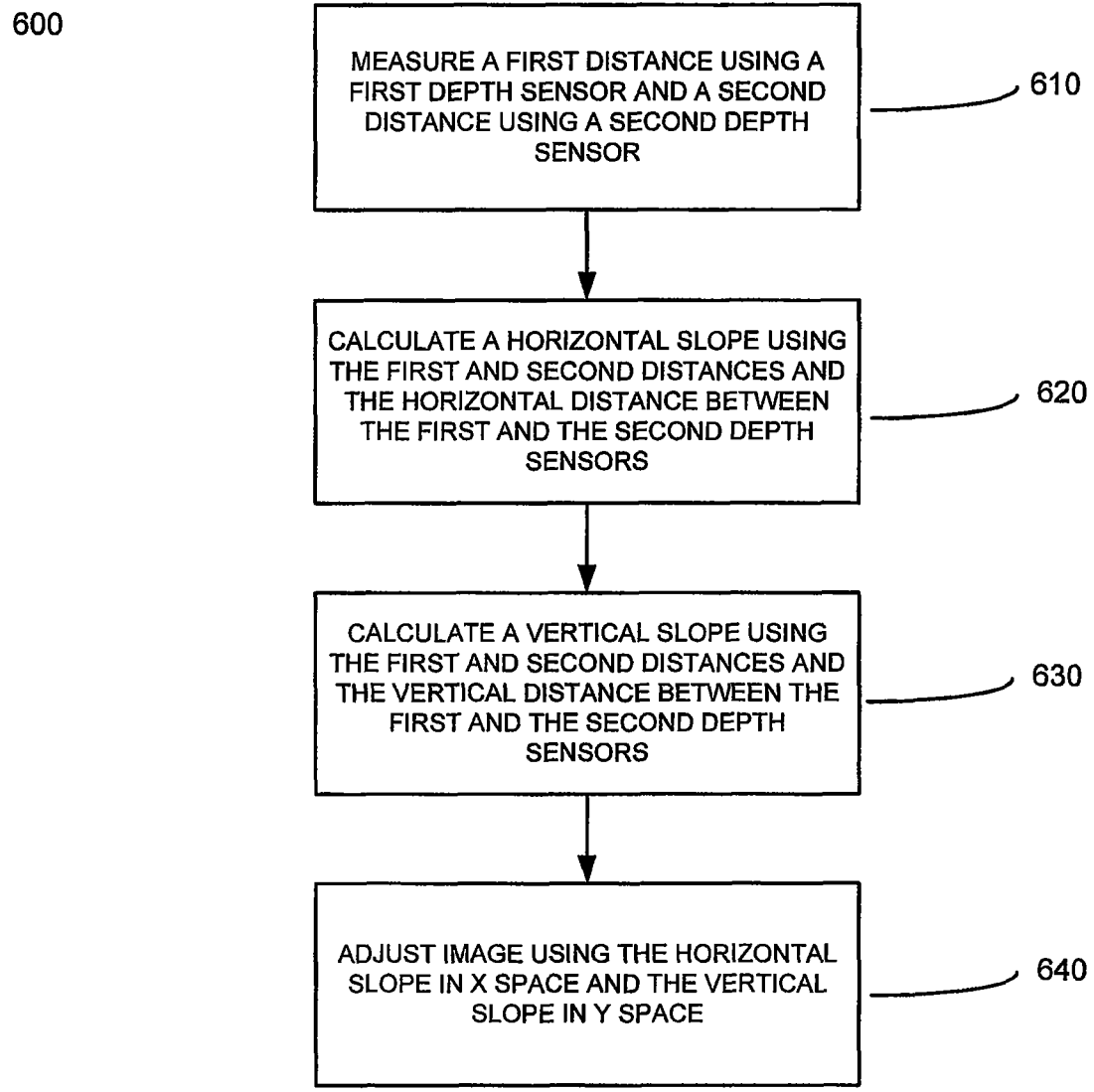
FIG. 6 is a flowchart depicting operations of one embodiment of the keystoning method employing depth sensors.

FIG. 6 is a flowchart generally describing a keystoning method 600 performed by one embodiment of an image projection system. The flow chart begins with operation 610, wherein a first depth sensor may measure a first distance and a second depth sensor may measure a second distance. As previously discussed with respect to FIG. 2, the first and the second depth sensors may be located at a known and/or determinable distance from one another. Also, the first and second depth sensors may be located in a number of positions on the projection system. In one embodiment, the first and second depth sensors may be located adjacent to the lens of the projection system. Typically, any type of depth sensors may be used in the embodiments described herein, including infrared, inductive, sonar/acoustic, capacitive and so on. Furthermore, although two depth sensors are described, more depth sensors may be used to account for additional axes. For example, the image processing system may include four depth sensors, two depth sensors for rotational and depth correction about the X-axis and two depth sensors for rotational and depth correction about the Y-axis. Similarly, three depth sensors may be employed, by aligning two depth sensors for at least rotational and depth correction along the X-axis and aligning the third depth sensor with one of the first two depth sensors, so that in conjunction, the two depth sensors may be used for at least rotational and depth correction along the Y-axis.

Next, in operation 620, a horizontal slope may be calculated using the first distance, the second distance and the horizontal distance between the first and the second depth sensors. The horizontal slope may provide the angle of the projection screen 520 with respect to the projection path of the projection system 510. The processor may calculate the horizontal by using the absolute value of the difference between the first distance and the second distance, and the horizontal distance between the first and second sensors. The horizontal distance between the first and second sensors may be known or determinable. The angle between the projection surface and the plane orthogonal to the projection path may then be calculated in a number of ways including, using any known trigonometric function. The angle may be used to create a rotational matrix for correction of distortion in the projected image. The creation of the matrix will be discussed further with respect to operation 640.

Similarly, in operation 630, a vertical slope may be calculated using the first distance, the second distance and the vertical distance between the first and the second depth sensors. In an example, the vertical slope may be calculated by using the absolute value of the difference between the first distance and the second distance, and the vertical distance between the first and second sensors. The vertical distance between the first and second sensors may be known or determinable. Using the method described with respect to the first angle and the horizontal slope, a second angle may be calculated, a transform may be created using the second angle and applied to the image. The calculation of the horizontal and vertical slope was previously discussed in more detail with respect to FIG. 5. Although only two depth sensors are discussed in this embodiment, it is possible to use any number of depth sensors greater than two depth sensors. In one embodiment, a camera may be used where each pixel is a depth sensor. This embodiment may compensate for the projection surface being at an angle, in addition to various other surface irregularities on the projection screen such as multiple bumps or projecting an image into a corner. Further, in this embodiment, the projection surface may be any type of surface such as a wall, a whiteboard, a door and so on, and need not be free of surface planar irregularities. The projection surface may be oriented at any angle with respect to the image projection path.

The horizontal and vertical slopes may be used in operation 640 to create a transform or matrix. Then, in operation 650, the transform or matrix of operation 640 may be applied to the image for projection. The transform of operation 650 may produce a corrected image substantially free of distortion. In one embodiment, rotational matrices may be applied directly to the image and then the transform created from the horizontal and vertical slopes may be applied to the output image. The rotational matrix may be produced using various methods, including employing software such as Open GL™.

Although the present invention has been described with respect to particular apparatuses, configurations, components, systems and methods of operation, it will be appreciated by those of ordinary skill in the art upon reading this disclosure that certain changes or modifications to the embodiments and/or their operations, as described herein, may be made without departing from the spirit or scope of the invention. Accordingly, the proper scope of the invention is defined by the appended claims. The various embodiments, operations, components and configurations disclosed herein are generally exemplary rather than limiting in scope.

The invention claimed is:

1. A computer-implemented method for correcting image distortion in an image projected on a surface comprising the operations of:
    measuring a first distance between an image projection system and a surface using a first measurement device;
    measuring a second distance between the image projection system and the surface using a second measurement device spatially separated from the first measurement device;
    calculating a first slope of the surface with respect to a projection path of the image projection system, the first slope corresponding to a first angular offset of the surface with respect to the image projection system;
    calculating a second slope of the surface with respect to the projection path of the image projection system, the second slope corresponding to a second angular offset of the surface with respect to the image projection system;
    creating a transform using at least the first slope and the second slope; and
    applying the transform to a first image, thereby creating a second image.

2. The method of claim 1, wherein the operation of creating the transform using the second slope further comprises:
    using a trigonometric function to calculate a second angle; and
    using at least the second angle to create the transform.

3. The method of claim 1, wherein the operation of creating the transform using the first slope further comprises:
    using a trigonometric function to calculate a first angle; and
    using at least the first angle to create the transform.

4. The method of claim 1, wherein the operation of using the first measurement device to measure the first distance further comprises using a depth sensor.

5. The method of claim 1, wherein the first measurement device is located on a first side and adjacent to a lens of the image projection system and the second measurement device is located on a second side and adjacent to the lens of the image projection system.

6. The method of claim 1, further comprising using an accelerometer located on the image projection system to compensate for at least a yaw of the image projection system.

7. The method of claim 4, further comprising using additional depth sensors located on the image projection system wherein the additional depth sensors are oriented downwardly.

8. The method of claim 7, further comprising accounting for a pitch of the image projection system using the additional depth sensors.

9. The method of claim 7, further comprising accounting for the yaw of the image projection system using the additional depth sensors.

10. The method of claim 1, further comprising measuring a plurality of distances using a camera where each pixel is a depth sensor.

11. The method of claim 1, further comprising using at least one infrared sensor to output and detect selected infrared signals.

12. A non-transitory computer readable medium, readable by a computer processor and having instructions stored thereon for causing one or more processors to:
   obtain a measure of a first distance between an image projection system and a surface using a first measurement device;
   obtain a measure of a second distance between the image projection system and the surface using a second measurement device that is spatially separated from the first measurement device;
   calculate a first slope of the surface with respect to a projection path of the image projection system, the first slope corresponding to a first angular offset of the surface with respect to the image projection system;
   calculate a second slope of the surface with respect to the projection path of the image projection system, the second slope corresponding to a second angular offset of the surface with respect to the image projection system;
   create a transform based, at least in part, on the first and second slopes; and
   apply the transform to a first image to create a second image.

13. The non-transitory computer readable medium of claim 12, wherein the instructions to create a transform comprise instructions to cause the one or more processors to:
   use a trigonometric function to calculate a first angle of the first slope; and
   use at least the first angle to create the transform.

14. The non-transitory computer readable medium of claim 12, wherein the instructions to create a transform comprise instructions to cause the one or more processors to:
   use a trigonometric function to calculate a second angle of the second slope; and
   use at least the second angle to create the transform.

15. The non-transitory computer readable medium of claim 12, wherein the instructions to obtain a measure of a first distance comprise instructions to use a depth sensor.

16. The non-transitory computer readable medium of claim 15, further comprising instructions to cause the one or more processors to use additional depth sensors to create the transform, wherein the additional depth sensors are located on the image projection system in a downward orientation.

* * * * *